July 29, 1947.　　　　C. ADAMS, JR　　　　2,424,542
PIPE COUPLING
Filed Feb. 24, 1944　　　3 Sheets-Sheet 1

INVENTOR.
CHARLES ADAMS JR.
BY
Louis L. Ansart
HIS ATTORNEY

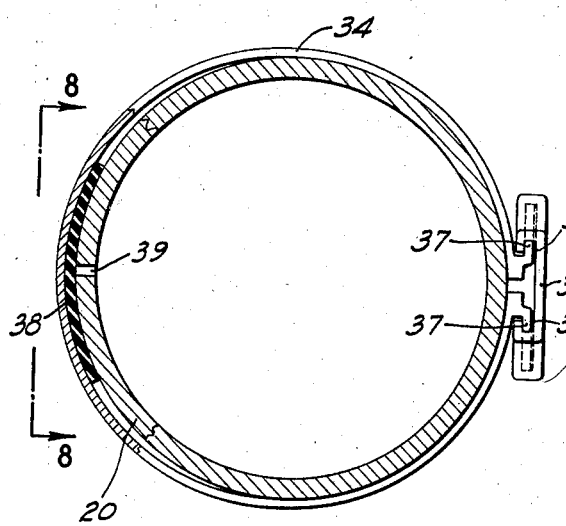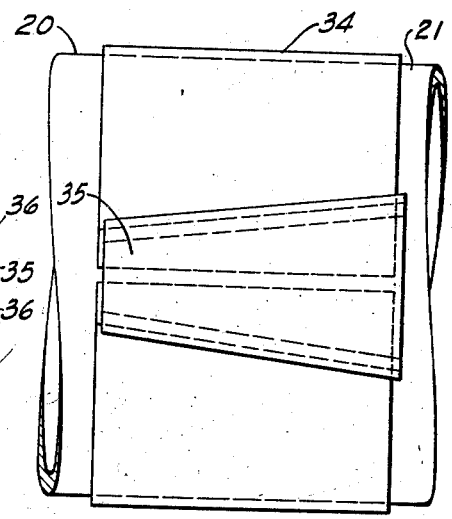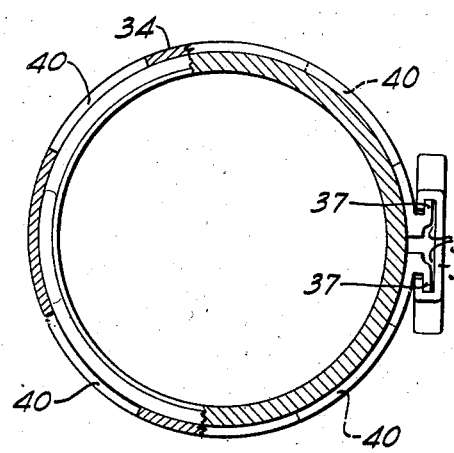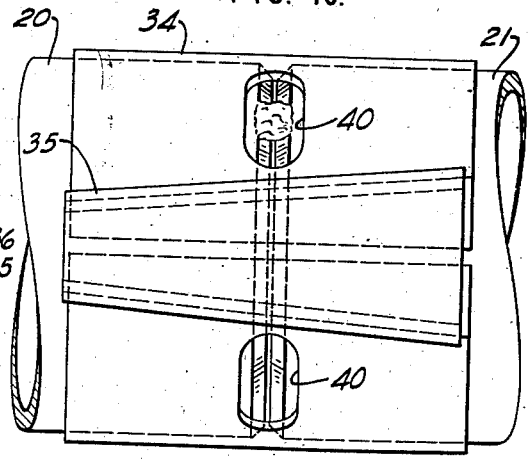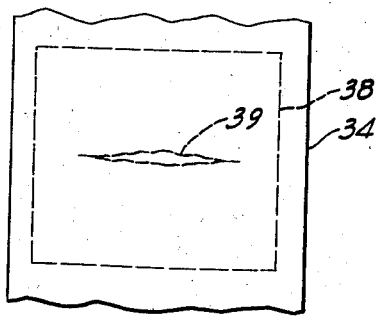

July 29, 1947.    C. ADAMS, JR    2,424,542
PIPE COUPLING
Filed Feb. 24, 1944    3 Sheets-Sheet 3

INVENTOR.
CHARLES ADAMS JR.
BY
*Louis C. Ansarb*
HIS ATTORNEY

Patented July 29, 1947

2,424,542

UNITED STATES PATENT OFFICE 2,424,542

PIPE COUPLING

Charles Adams, Jr., Croton-on-Hudson, N. Y.

Application February 24, 1944, Serial No. 523,625

6 Claims. (Cl. 285—194)

This invention relates to clamps and more particularly to wedge lock clamps adapted for various uses.

An important object of the invention is to provide a novel and advantageous clamp of the general character specified.

Another object of the invention is to provide a clamp having at least one point at which two enclosing parts are connected and drawn together by locking means such as a wedge lock.

Another object is to provide a clamp comprising a plurality of enclosing members and means such as wedge locks for drawing said members together, at least one of said enclosing members having at one edge a socket containing a toothed member, such as a wedge, to provide effective gripping by said clamp.

Another object is to provide a clamp with means such as wedge lock means for tightening the clamp over two adjacent ends of pipe, said clamp being provided at each edge with sockets adapted to receive wedges having at their inner faces teeth to engage and hold the pipe ends together. Preferably, either the bottom of each recess or the adjacent face of the wedge may be rounded to facilitate adjustment of the wedge to proper position.

Another object is to provide a flexible pipe joint comprising a clamp to enclose adjacent pipe ends and to be drawn tightly around the same by tightening means, said clamp having a circumferential groove at its inner face and a sealing strip in said groove and having in inwardly facing sockets toothed members to engage said pipe ends and prevent separation thereof although permitting bending at the joint.

Another object is to provide a clamp which may be used to clamp together parts of a form or to serve directly as a form.

Another object is to provide a two-piece clamp in which the two pieces or parts may be positioned around the part or parts to be clamped and may be tightened by relative longitudinal movement due to wedge joint connection between the two pieces or parts of the clamp by means of projecting flanges on one part adapted to cooperate with corresponding grooves on the other.

Another object is to provide a clamp comprising a single relatively thin piece of resilient metal adapted for use with generally round members by being sprung open and closed around the same, and then clamped by suitable means such as a wedge lock. This form is well adapted for use in holding a patch on a pipe, for holding two pipe ends together and permitting spot welds to be made at points determined by openings in the clamp preparatory to making a complete welded joint after removal of the clamp, and for enclosing a pipe covered for example with insulating material to form a casing made up of successive units of this kind.

Another object is to provide a wedge clamp adapted to clamp and hold side by side the ends of two oppositely extending objects such as cables. In this case the interior of the clamp when closed may be oval in shape and it may be necessary to have heavy clamp members in order to prevent spreading of the side walls.

A further object is to provide a wedge lock device to connect two cable ends side by side, comprising an enclosing yoke with an interior in two communicating parts with side ridges, extending part way across the interior to assist in maintaining the cable ends in proper position with respect to each other. These communicating parts are tapered in opposite directions with the small end of each part adjoining the large end of the other part. The cable ends can then be placed in the yoke without any difficulty and may be wedged in said interior by driving axially into each cable end a generally conical member such as a tack or screw to spread the cable end and wedge the cable ends in position in the yoke.

Other objects, features and advantages will appear upon consideration of the following detailed description and of the drawing, in which Fig. 1 is a side elevation illustrating one embodiment of the invention in use;

Fig. 6 is an end view illustrating the use of another form of clamp to hold a patch over a hole in a pipe, the pipe being shown in section, and the pipe, the patch and the clamp being broken away for greater clarity;

Fig. 7 is a view of the structure of Fig. 3 as viewed from the right thereof;

Fig. 8 is a view from the line 8—8 on Fig. 6, looking in the direction of the arrows.

Fig. 9 is a view similar to Fig. 6, but in which the main clamping member fits closely around the adjacent pipe ends at the pipe joint and there are openings to permit spot welding of the ends through openings provided therefor.

Fig. 10 is a view obtained by looking at the structure of Fig. 9 from the right.

Referring to Figs. 1, 2, 3, 4 and 5, a flexible joint between two aligned pipes 20 and 21 may be provided by means including two clamping members 22 and 23 adapted to fit over the adjacent ends of pipes 20 and 21 and drawn together by suitable clamping means. Adjacent edges of clamping members 22 and 23 are preferably parallel and these clamping members are provided at the outer sides of adjacent ends with projections 24 and 25 having edges which are inclined away from each other from one side of the pipe joint to the other, like opposite edges of a wedge.

Figure 1:
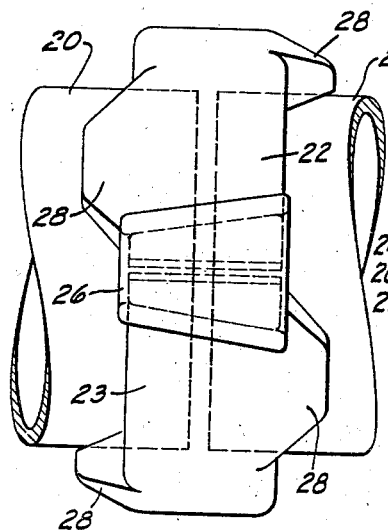
Figure 2:
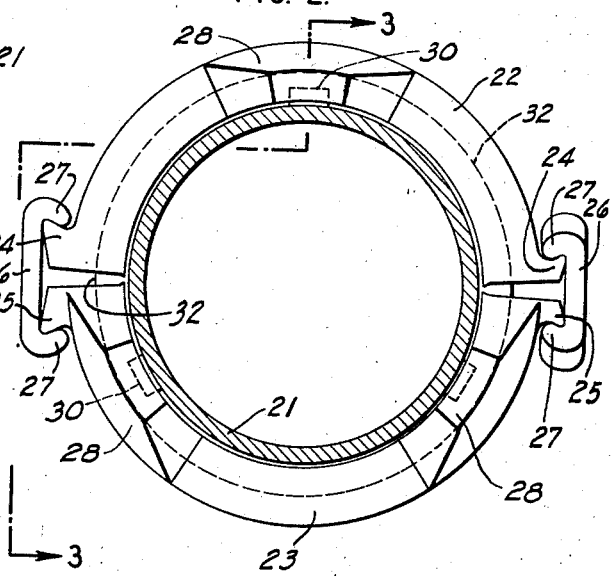
Fig. 2 is a view of the assembly of Fig. 1 as seen from the right.
Figure 3:
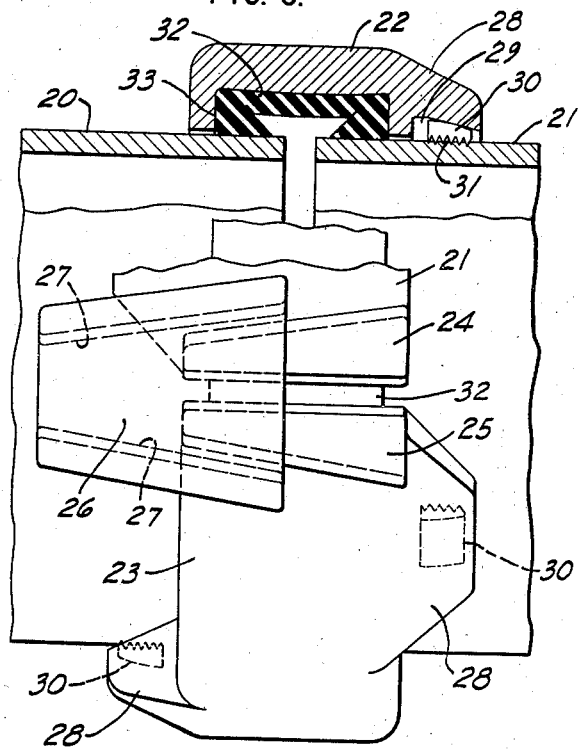
Fig. 3 is a section taken on the line 3—3 of Fig. 2 to illustrate a gasket for sealing the pipe joint.
Figure 4:
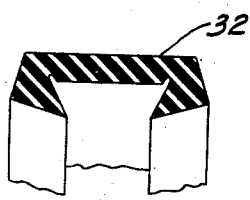
Fig. 4 is a cross-section of the gasket illustrating its form before placing it around the pipe ends.
Figure 5:
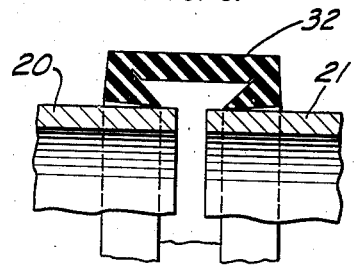
Fig. 5 is a section illustrating the form of the gasket after it has been placed around the pipe ends but before the clamp tightening which causes it to assume the cross-sectional form illustrated in Fig. 3.

Over two adjacent projections 24 and 25 is placed a tightening member 26 which may be formed with a wedge-shaped top and inwardly extending parts 27 to engage the oppositely facing edges of projections 24 and 25 and urge the projections toward each other when a suitable relative longitudinal movement is produced between the tightening member 26 and the clamping members 22 and 23. Obviously reversal of this movement will loosen the clamp. As indicated in Fig. 2, the arrangement may be such that right hand member 26 is moved to the rear for tightening and left hand member 26 is moved to the front for that purpose, thus providing for a counterbalancing of the tendencies to move the clamp along the pipes 20 and 21, particularly if the two members 26 are moved in clamp-tightening directions at the same time.

The projections 24 and 25 and parts 27 of the tightening members 26 are so shaped as to hold the tightening members on said projections 24 and 25, the parts 27 providing what are in effect grooves to receive tongues provided by the projections 24 and 25.

In order to assure the holding together of the pipe ends while permitting bending of the joint, the clamping members 22 and 23 are provided at the inside of their side edges, preferably in projections 28, with recesses 29 having bottoms inclined toward the common axis of the pipes and along said axis away from the joint, and blocks or wedges 30 having inclined faces to engage the bottoms of said recesses and opposite faces with teeth 31 to engage the pipes and hold them against outward movement with reference to the clamping members but permitting inward movement due to the fact that the blocks or wedges 30 are shorter than the recesses. This inward movement is, however, limited in that any wedge at that location will move inwardly with the pipe, due to engagement of its teeth therewith, until the wedge engages the inner end of the socket whereupon the inner end of the wedge will, due to the inclined position of the wedge (Fig. 2) with the teeth at its outer end deeper in the material of the pipe, ride up the inner end of the socket and exert a toggle action pressing the outer end of the wedge against the pipe. Preferably, either or both of the inclined bottoms of the recesses 29 or inclined faces of wedges 30 are rounded to permit self-adjustment of the wedges against the pipe.

The pipe coupling thus far described will hold the pipes against separation but has no liquid seal. Such sealing may, however, be effected by means of a suitable washer 32 which is seated in interior grooves 33 in said clamping members 22 and 23. Such washer must be compressible and resilient and preferably may be in the form of an inwardly facing channel of rubber placed in the grooves 33 and compressed by tightening the clamp. As manufactured, the gasket may have the cross-section shown in Fig. 4. However, when stretched around the pipe it will take the cross-sectional shape shown in Fig. 5, and when finally compressed will assume the cross-section shown in Fig. 3.

It should be understood that this clamp may be used to advantage for many other purposes. For example, with the gasket omitted, the clamp would be very effective as a floor clamp resting on a floor and supporting a pipe or column clamped therein. The clamp might also be used with foundry flasks or forms for concrete construction.

Another form of clamp, as illustrated in Figs. 6, 7, 8, 9 and 10, may comprise a clamping member 34 in the form of a sheet of relatively thin, resilient metal, normally in shape to enclose a pipe or other object and adapted to be sprung open and placed around the pipe or other object. Tightening may be effected by a suitable tightener 35 of general wedge shape and provided at its edges, as by extending the metal rearwardly and inwardly to form grooves or recesses 36 adapted to receive tongues 37 on the edges of the clamping member 34. This form of the invention is particularly adapted for use in forming a casing for pipes covered by insulating material. For this purpose the interlocking means do not extend to the ends of the sections thus allowing an end of one clamp or unit to enclose an adjacent end of another unit. A casing of this kind may be sealed against water by introducing cement in plastic form between adjacent edges and then tightening the clamp.

In Figs. 6 and 7, the second form of clamp is shown as used to clamp a patch 38 over a hole or break 39 in the pipe (see Figs. 6 and 8). As illustrated in Figs. 9 and 10, the clamping member 34 is provided with openings 40 through which the ends of pipes 20 and 21 may be spot welded preparatory to complete welding after removal of the form.

Figure 11:
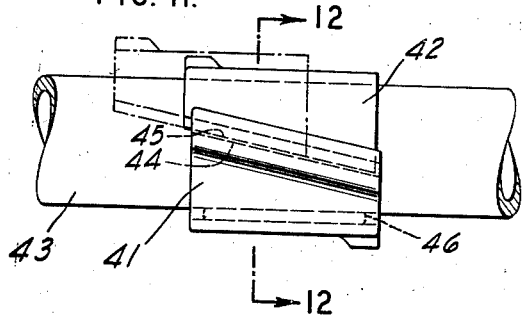
Fig. 11 is a side elevation of a pipe with another form of clamp in use for clamping a patch on the pipe.

A third form of clamp illustrated in Fig. 11 may comprise two clamping members 41 and 42 each extending substantially halfway around a pipe 43, said member 41 being provided at its edges with inwardly facing grooves 44 and the other being provided at its edges with outwardly projecting tongues 45, the edges of said members being so inclined (Fig. 11) that upon insertion of tongues 45 in grooves 44 and relative longitudinal movement of the members 41 and 42 to bring them together, the clamping members will be tightened around the pipe 43 to secure a patch 46 over a hole 47 in the pipe.

Figure 12:
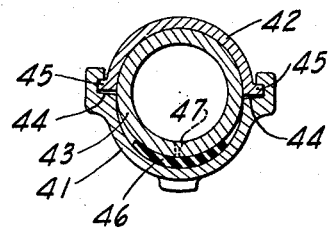
Fig. 12 is a section on the line 12—12 of Fig. 11.
Figure 14:
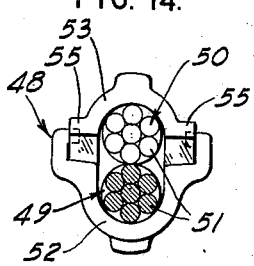
Fig. 14 is a view of the left-hand end of the arrangement of Fig. 3 with the clamp open.
Figure 13:
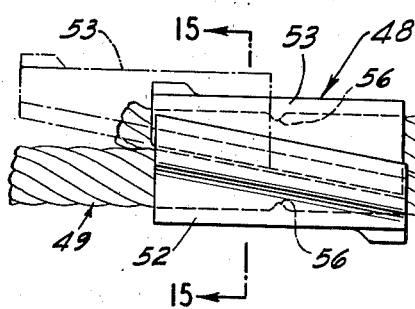
Fig. 13 is a side elevation of another form of clamp in use to secure together two cable ends.
Figure 15:
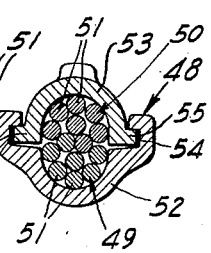
Fig. 15 is a section taken along the line 15—15 of Fig. 13 when the clamp is closed.

A fourth form of clamp 48 illustrated in Figs. 13, 14 and 15 is particularly adapted for clamping together side by side the ends of two cables 49 and 50 which may be made up of strands 51 of twisted wire arranged around a central strand which may be of hemp or like material. This clamp is similar in most respects to that shown in Figs. 11 and 12, but, as illustrated, the interior is oval in cross section to accommodate the two cable ends to better advantage. Clamp 48 comprises a clamping member 52 adapted to receive substantially one-half of the compressed cable ends and a clamping member 53 of substantially the same internal capacity as member 52. Each of the members 52 and 53 has substantially parallel inclined edges, the edges of member 52 having opposed grooves 54 adapted to receive outwardly extending tongues 55 on member 53. In order to obtain a better grip on the cables 49 and 50, the interior of these members may be roughened as by provision of projections 56. With the clamping members and cables arranged substantially as shown in Fig. 13, partly in dot-and-dash lines, and in Fig. 14, the clamping members 52 and 53 may be given a relative longitudinal movement to closed positions illustrated in full lines in Figs. 13 and 15. It will be evident that tension on the cables will tend to tighten the clamp.

Figure 18:
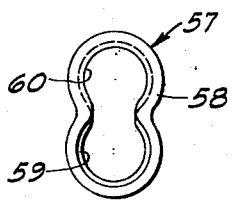
Fig. 18 is a view of the left end of the structure shown in Fig. 16.
Figure 17:
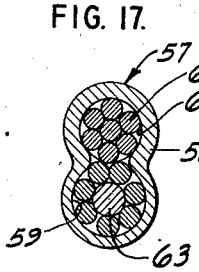
Fig. 17 is a section on the line 17—17 of Fig. 16.
Figure 16:
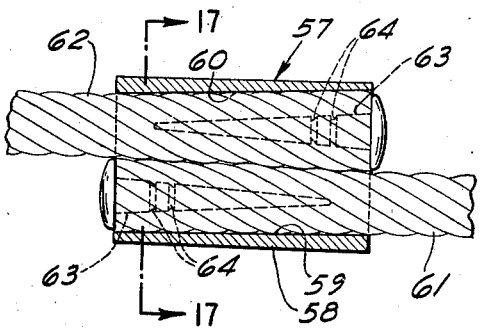
Fig. 16 is a longitudinal section of another form of clamping means adapted to connect two cable ends.

A fifth form of clamp designated by 57 is illustrated in Figs. 16, 17 and 18. This clamp comprises a yoke 58 provided with generally parallel communicating passages 59 and 60 tapered from end to end in the same way but in opposite directions. The smaller ends of these passages 59 and 60 are large enough to receive the ends of cables 61 and 62 which are positioned in the passages with the extreme ends of the cables at the large ends of the passages. After the cables are thus positioned in the passages 59 and 60 of the yoke 58, tapered members 63, in the general form of tacks or drive screws, are driven into the ends to wedge the cable ends firmly in the yoke 58. To prevent the members 63, such as illustrated, from working out of the cable ends, these members may be roughened as indicated at 64. It should be understood that the sides of the yoke must be of sufficient strength to prevent spreading and that if desired a reenforcing partition might be used between the passages 59 and 60.

It should be understood that various changes may be made and that various features may be used without others, without departing from the true scope and spirit of the invention.

Having thus described my invention, I claim:

1. A flexible joint between two connected members of substantially equal cross-section comprising a plurality of clamping members extending around the ends of said connected members, means to tighten said clamping members around said clamped members, said clamping members having at the interior thereof and at each end of the joint recesses extending longitudinally of the connected members and of gradually decreasing depth away from the ends of the connected members, and toothed wedges in said recesses whereby inward movement of the wedges in the recesses may take place in bending the joint but outward movement beyond the predetermined limit is prevented.

2. A flexible joint connecting adjacent ends of two aligned pipes, comprising a plurality of clamping members arranged end to end around said adjacent pipe ends, means to tighten said clamping members around the pipe ends, said clamping members having at their interiors inwardly facing grooves providing a substantially continuous groove, a gasket in the form of an inwardly facing channel positioned in said groove, said clamping members having at the interior thereof and at each end of the joint recesses with bottom walls sloping inwardly toward the common axis of the pipes and away from the joint, and wedges in said recesses with teeth facing said pipes, permitting inward movement of such parts of the pipes but preventing outward movement beyond the limit originally determined.

3. A flexible joint connecting adjacent ends of two aligned pipes, comprising a plurality of clamping members arranged end to end around said adjacent pipe ends, means to tighten said clamping members around the pipe ends, said clamping members having at their interiors inwardly facing grooves providing a substantially continuous groove, a gasket in the form of an inwardly facing channel positioned in said groove, and having at the edges of the flanges of said gasket flexible lips extending toward each other, said clamping members having at their interiors and at each end of the joint recesses with bottom walls sloping inwardly toward the common axis of the pipes and away from the joint, and wedges in said recesses with teeth facing said pipes permitting inward movement of such parts of the pipes but preventing outward movement beyond the limit originally determined, the faces of the wedges opposite to the toothed faces being curved to permit adjustment of the wedges against the pipe.

4. A flexible joint connecting adjacent ends of two aligned pipes, comprising a plurality of clamping members arranged end to end around said adjacent pipe ends, means to tighten said clamping members around the pipe ends, said clamping members having at their interiors inwardly facing grooves providing a substantially continuous groove, a gasket in the form of an inwardly facing channel positioned in said groove, said clamping members having at their interiors and at each end of the joint recesses having bottom walls sloping inwardly toward the axis of the pipe sections and away from the joint, and toothed wedges in said recesses permitting inward movement of such parts of the pipes but preventing outward movement beyond the limit originally determined, the inclined bottom walls of the recesses being curved to permit adjustment of the wedges against the pipe.

5. A device for clamping therein one or more elongated devices extending therethrough, comprising a clamping member having at its interior a longitudinal recess to receive substantially one-half of the device or devices to be clamped and having side edges lying in a plane inclined to the axis of said clamping member, a second clamping member of the same general shape but with its side edges inclined in the opposite direction, tightening members along adjacent edges of said clamping members, interlocking devices at the inclined edges of said clamping members and tightening members whereby relative longitudinal movement of the tightening members and the clamping members will clamp them together or release said clamping members, each of said clamping members having at each end and at its interior face at least one recess with a bottom wall sloping inwardly toward the common axis of said clamping members, and a toothed wedge in each recess in an interior face.

6. A device for clamping therein one or more elongated devices extending therethrough, comprising a clamping member having at its interior a longitudinal recess to receive substantially one-half of the device or devices to be clamped, a second clamping member of the same general shape, and means at the interior of said longitudinal recesses to provide substantially non-slip engagement between a clamping member and a clamped device, tightening members along adjacent edges of said clamping member, said clamping member and tightening members having interlocking edges whereby longitudinal movement of the tightening members will clamp said clamping members together or release them.

CHARLES ADAMS, Jr.

REFERENCES CITED

The following references are of record in the file of this patent:

UNITED STATES PATENTS

| Number | Name | Date |
|---|---|---|
| 2,073,338 | Durkee | Mar. 9, 1937 |
| 1,930,194 | Dillon | Oct. 10, 1933 |
| 1,789,379 | Dillon | Jan. 20, 1931 |
| 1,905,324 | Waters | Apr. 25, 1933 |
| 1,677,623 | Eilar | July 17, 1928 |
| 710,721 | Sindelar | Oct. 7, 1902 |
| 2,020,554 | Johnson | Nov. 12, 1935 |
| 624,770 | Eibee | May 9, 1899 |
| 48,517 | Chambers | July 4, 1865 |